3,140,274
COPOLYMERS
Harry A. Cantor, Plainfield, Joseph A. Vona, Westfield, and Bruce S. Ainsworth, Jr., Mountain Lakes, N.J., assignors to Celanese Corporation of America, New York, N.Y., a corporation of Delaware
No Drawing. Filed Oct. 5, 1960, Ser. No. 60,590
13 Claims. (Cl. 260—78.3)

This invention relates to new polymeric products and a method of producing them. More particularly, this invention relates to new copolymers of an oxetane and a lactone.

It is an object of this invention to provide new polymeric products. It is a further object of this invention to provide new copolymers which are useful in a wide variety of applications. Further objects will become apparent from the following detailed description and claims.

In accordance with one aspect of the invention, an oxetane is copolymerized with a lactone.

The oxetane is preferably a 3,3-disubstituted oxetane such as the 3-alkyl-3-hydroxyalkyl oxetanes, e.g., 3-methyl-3-hydroxymethyl oxetane and 3-ethyl-3-hydroxymethyl oxetane, the 3,3-bis (hydroxyalkyl) oxetanes such as 3,3-bis (hydroxymethyl) oxetane, i.e. pentaerythritol oxetane, dialkyl oxetanes such as 3,3-dimethyl oxetane, the 3-alkyl-3-haloalkyloxetanes such as 3-methyl-3-chloromethyl oxetane, the 3,3-bis (haloalkyl) oxetanes such as 3,3-chloromethyl oxetane, wherein the substituent groups contain for example 1 to 8 carbon atoms and the halogen atoms may be chlorine, bromine, iodine or fluorine. The preferred oxetane is 3-ethyl-3-hydroxymethyl oxetane, i.e., trimethylolpropane oxetane. Other substituent groups, e.g., aryl, nitro, cayno and alkoxy may also be present as substituents on the 3-carbon atom of the oxetane used in preparing the copolymers of this invention.

The lactone is preferably a beta-lactone, i.e., a lactone of a beta-hydroxycarboxylic acid, e.g., a beta-hydroxyalkanoic acid containing 3 to 12 carbon atoms such as beta-propiolactone, beta-butyrolactone, a beta-valerolactone, ' beta-isovalerolactone and beta-undecalactone. Other lactones may also be used such as gamma-lactones, e.g., of gamma-hydroxyalkanoic acids containing 4 to 12 carbon atoms such as gamma-butyrolactone and gamma valerolactone and delta-lactones, e.g., of delta-hydroxyalkanoic acids containing 5 to 12 carbon atoms, such as delta-valerolactone. The above lactones may also have their hydrogen atoms substituted with various substituents which do not interfere with the polymerization, such as halogen, aryl, nitro, cyano and alkoxy.

The preferred lactone is beta-propiolactone.

The copolymers of this invention may be prepared in bulk, i.e., by mixing comonomers together or in solution i.e., by dissolving the comonomers in a suitable solvent. The polymerization may also be carried out by dispersing the monomers in a medium in which the monomers are insoluble and in which the polymer is either soluble or insoluble. Each comonomer may be used within a wide range of proportions, e.g., 1 to 99% by weight of the monomeric mixture. Preferably the oxetane is used within the range of 25 to 85% by weight of the monomeric mixture.

While it is possible to carry out the polymerization in the absence of a catalyst, e.g., by heating the polymerizable mixture until the polymerization reaction is initiated, it is preferable in most cases to employ a catalyst for the polymerization. A suitable class of catalysts is the Lewis acids i.e., compounds which tend to accept electrons under the conditions of reaction. Some suitable compounds within this class are the boron trihalides, e.g., boron trifluoride, polyphosphoric acid, orthophosphoric acid, sulfuric acid and trifluoroacetic acid. Boron trifluoride is the preferred catalyst especially when it is complexed with dialkyl ethers such as diethyl or dibutyl ether, water or acetic acid. The catalyst may be used for example in an amount of 0.05 to 5% by weight of the monomers.

The polymerization may be initiated, for example, at a temperature of −30 to 100° C. The reaction may be relatively rapid in which case there is usually a perceptible heat of reaction or it may be quite slow in which cas there is no perceptible heat of reaction. The period of polymerization may range, for example, from 30 seconds to several hours. The pressure within the reaction zone may vary from 15 to 75 p.s.i. absolute. However, atmospheric pressure is suitable in most instances.

When solution polymerization is used, any compound which is capable of dissolving the monomers may be employed as the solvent. Suitable solvents are for example benzene, ethyl acetate, a mixture of 50% by weight of ethyl acetate and 50% by weight of heptane, perchloroethylene, cyclo-hexanone and cyclohexane. For solution polymerization, the monomers may be first dissolved in the solvent in the appropriate quantities and a sufficient amount of catalyst added to initiate the reaction. In some cases, it may be necessary to heat the reaction mixture somewhat before the reaction is initiated.

The following examples further illustrate the invention:

Example I

To a mixture of 50 parts by weight of trimethylolpropane oxetane and 50 parts by weight of beta propiolactone at room temperature was added 0.1% based on the weight of the monomers of a catalyst prepared by reacting equal molar quantities of boron trifluoride and diethyl ether. A violent exothermic reaction occurred and the polymerization proceeded very quickly. Upon cooling a clear, tacky and water-insoluble polymer was obtained which was useful as an adhesive.

Example II

The procedure of Example I was repeated except that dibutyl ether rather than diethyl ether was used in the catalyst. The temperature rose from 25° C. to 133° C. in several minutes and the resulting copolymer was a viscous liquid which had very good clarity and finally gelled on standing. When the copolymer was applied to the surface of a glass plate, a tacky coating was obtained. When the copolymer was subjected to a curing cycle for one hour at 150° C., a non-tacky rubbery product was obtained.

Because of the outstanding clarity and adhesive characteristics of this copolymer, it is useful as a safety glass interlayer.

Example III

The procedure of Example II (i.e., using a $BF_3$-dibutyl ether catalyst) was repeated except that the monomeric mixture contained 75% by weight of trimethylolpropane oxetane and 25% by weight of beta-propiolactone. The temperature rose from 25 to 93° C. in several minutes after which a waxy solid copolymer insoluble in benzene, water and ethyl acetate was obtained. The copolymer is suitable as a viscosity index improver in lubricant base stocks or it may be employed itself as a lubricant or grease base stock by proper control of viscosity which may be effected by use of suitable compatible liquids.

Example IV

The procedure of Example II was repeated except that the monomeric mixture contained 25% by weight of trimethylolpropane oxetane and 75% by weight of beta-propiolactone. The temperature rose from 25 to 75° C. in several minutes after which a liquid product was obtained which was very tacky and turned viscous on aging.

The copolymer of this example is useful in formulations for lubricants and greases and, by proper control of viscosity, may be employed as lubricant or grease base stocks.

The copolymers of this invention may be prepared with widely varying properties which make them useful for different applications in addition to those pointed out in the foregoing examples, e.g., self-supporting films for wrapping, coating compositions such as paints, textile-treating compositions, and plastic buttons, etc.

It is to be understood that the foregoing detailed description is given merely by way of illustration and that many variations may be made therein without departing from the spirt of our invention.

Having described our invention what we desire to secure by Letters Patent is:

1. A condensation polymer of an oxetane having a structural formula

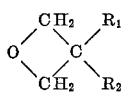

wherein $R_1$ and $R_2$ are selected from the group consisting of alkyl, hydroxyalkyl and haloalkyl and wherein said alkyl group contains one to eight carbon atoms and a beta-lactone containing 3 to 12 carbon atoms, wherein each monomer constitutes about 1 to 99% of said polymer.

2. The condensation polymer of claim 1 wherein said alkyl group is selected from the group consisting of methyl and ethyl.

3. The condensation polymer of claim 2 wherein said oxetane is 3-ethyl-3-hydroxymethyl oxetane.

4. The condensation polymer of claim 1 wherein said lactone is a beta-propiolactone.

5. A copolymer of 3-ethyl-3-hydroxymethyl oxetane and beta-propiolactone.

6. A process comprising mixing an oxetane having the structural formula

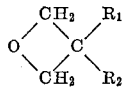

wherein said $R_1$ and $R_2$ are selected from the group consisting of alkyl, hydroxyalkyl and haloalkyl and wherein said alkyl group contains one to eight carbon atoms, and wherein said oxetane constitutes about 1 to 99% of this mixture and a beta-lactone containing 3 to 12 carbon atoms and adding a Lewis acid as catalyst to the mixture to obtain a copolymer.

7. The process of claim 6 wherein said alkyl group is selected from the group consisting of methyl and ethyl and said lactone is a beta-propiolactone.

8. The process of claim 6 wherein said oxetane is 3-ethyl-3-hydroxymethyl oxetane and said lactone is beta-propiolactone.

9. The process of claim 6 wherein said Lewis acid comprises boron trifluoride.

10. The process of claim 9 wherein said Lewis acid comprises a complex of boron trifluoride and a member of the group consisting of dialkyl ethers, water and acetic acid.

11. A process comprising forming a mixture of 3-ethyl-3-hydroxymethyl oxetane and beta propiolactone and adding a small amount of a complex of boron trifluoride and a dialkyl ether as catalyst to said mixture to institute a polymerization reaction.

12. The process of claim 11 wherein said ether is diethyl ether.

13. The process of claim 11 wherein said ether is dibutyl ether.

References Cited in the file of this patent

UNITED STATES PATENTS

| | | |
|---|---|---|
| 2,455,731 | Caldwell | Dec. 7, 1948 |
| 2,764,575 | Kohler et al. | Sept. 25, 1956 |
| 2,878,236 | Young et al. | Mar. 17, 1959 |
| 2,962,455 | Hostettler et al. | Nov. 29, 1960 |

OTHER REFERENCES

Sorenson: "Preparation Methods of Polymer Chemistry," Interscience Publishers Inc., New York, 1961, page 251.